United States Patent Office 2,694,794
Patented Nov. 16, 1954

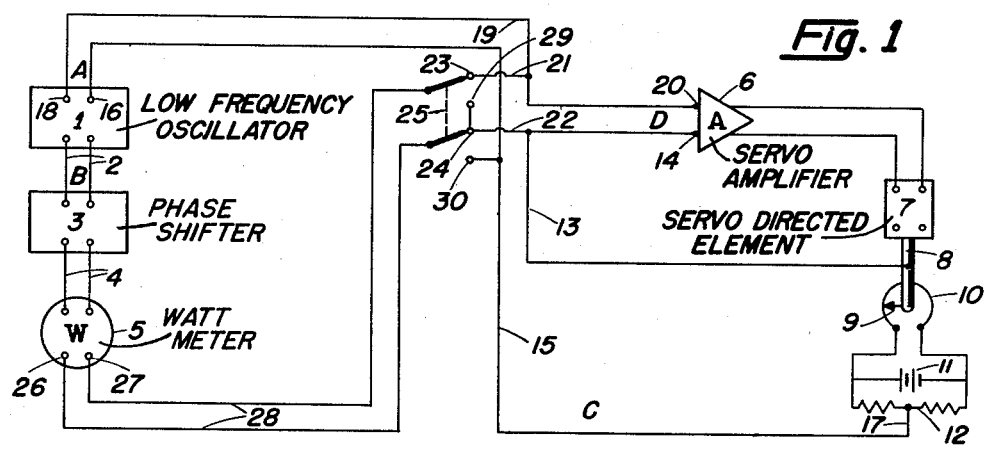
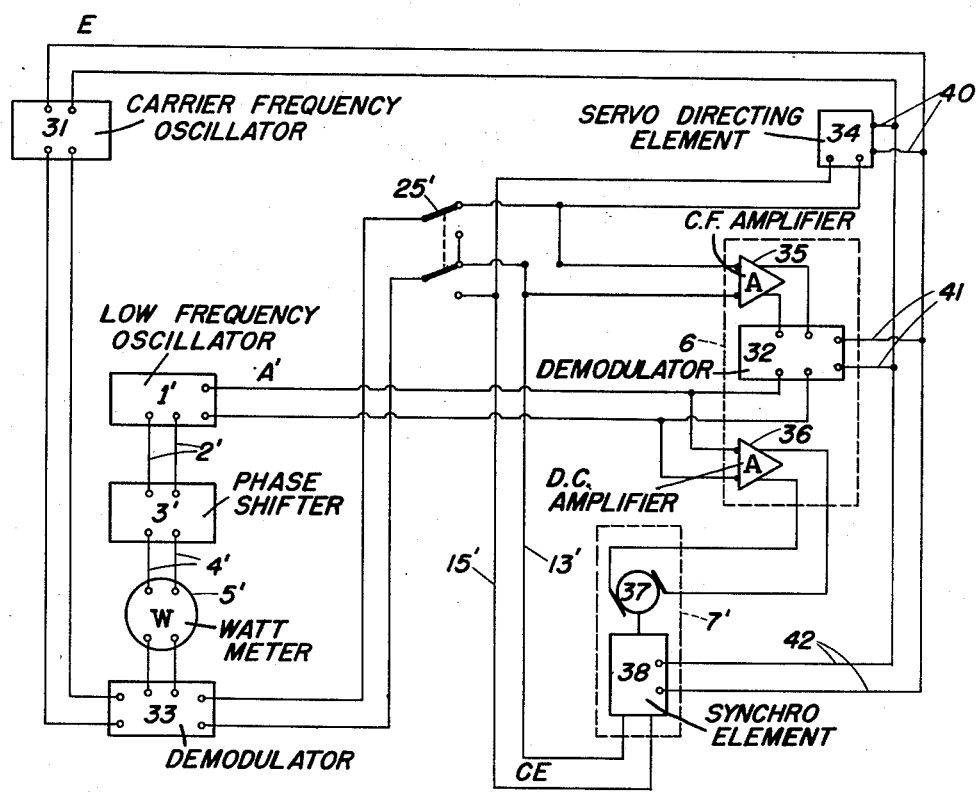

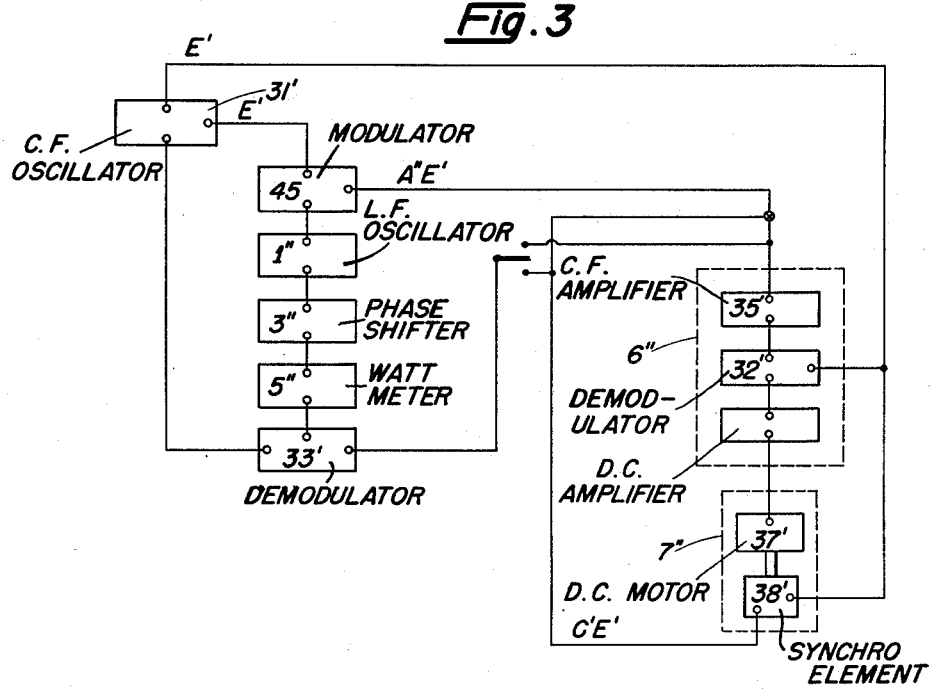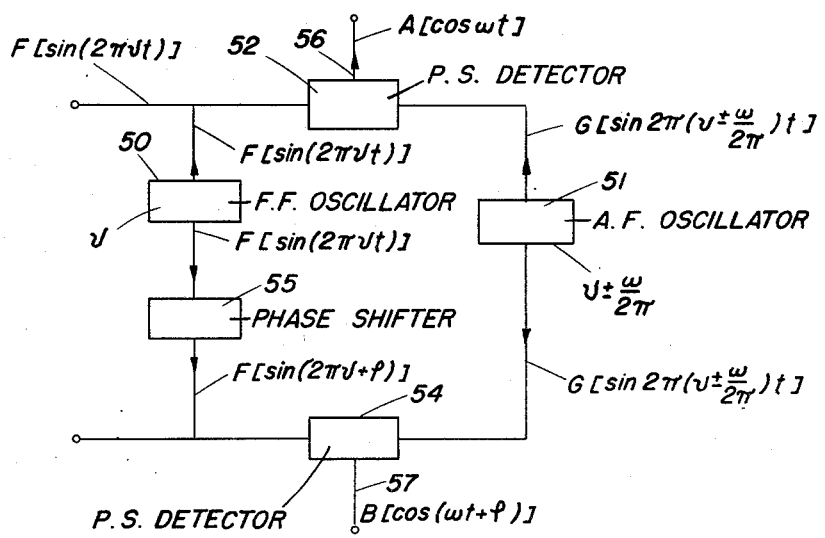

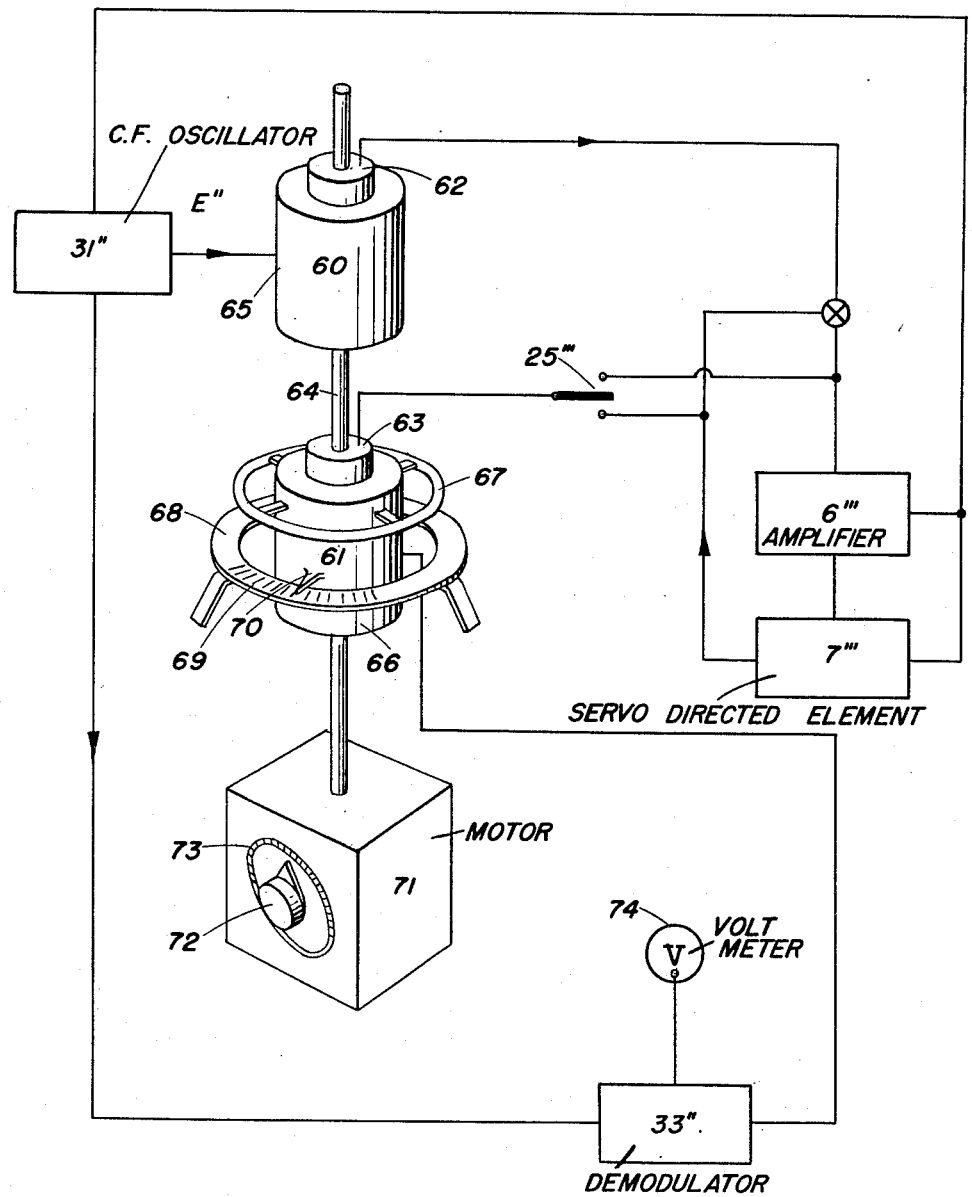

2,694,794
APPARATUS FOR MAKING FREQUENCY ANALYSES OF TRANSMISSION SYSTEMS AND THE LIKE

Åke Hugo Petrus Blomqvist, Johanneshov, and Björn Hans Reinhold Tornquist, Boliden, Sweden, assignors to Aktiebolaget Bofors, Bofors, Sweden, a joint-stock company of Sweden Application April 13, 1951, Serial No. 220,748

Claims priority, application Sweden April 28, 1950

6 Claims. (Cl. 324—57)

This invention relates to means designed primarily for obtaining frequency analysis of a transmission system or the like, for example an electrical system or part thereof, and also useful with modification in analyzing a mechanical system or a combined electrical and mechanical one, requiring only in the latter cases that means be provided for converting mechanical impulses to electrical signals.

Frequency analysis is obtained in accordance with the invention by the employment of a sinusoidal signal of predetermined frequency and known amplitude and phase angle. This signal is supplied to the system or circuit being analyzed to be transmitted to it, and by suitable apparatus the amplitude and phase angle of the signal transmitted are compared with corresponding characteristics of the original signal so that data are obtained which are indicative of the differences between the signal supplied to and the signal delivered by the system and thus represent effects of signal transmission in the system. Corresponding data are obtained with respect to the system using signals of different frequencies until sufficient have been accumulated to afford the basis for drawing curves from which it can readily be determined whether the system is suitable for its intended use, which may comprehend use as an element or component of a larger system; the performance which may be expected from it when it is employed for such purposes may also be deduced with reasonable accuracy from such curves. An example of the kind of curves to which reference has just been made is the so-called Nyquist curve showing the ratio between the original signal and the signal as affected by its transmission in the system with frequency as the parameter and such curves, preferably based on study of the fundamentals of the signals without reference to their harmonics, are convenient means for establishing whether the system is suitable; if they show it is not adjustment or modification of the system can be made empirically, new readings then taken in a subsequent analysis corresponding to the preceding one and a curve drawn and this procedure repeated if necessary until a curve is obtained which shows that the system has the desired characteristics in respect to its influence upon the amplitude and phase angle of a signal transmitted through it.

It is thus a principal object of the invention to provide means for determining values of amplitude and phase angle modification of a periodically fluctuating signal adequate to supply the basis for plotting curves of the character mentioned.

Other objects, purposes and advantages of the invention will hereinafter more fully appear or will be understood from the following more particular description of it in which reference will be had to the drawings schematically illustrating primarily by way of wiring diagrams the manner in which said objects are attained.

In the said drawings Fig. 1 is a diagram of one circuit which may be employed for making a frequency analysis of a portion of a servo system to permit ascertainment of its potentialities and limitations in service;

Fig. 2 is a corresponding diagram of a modified circuit adapted for the same purpose connected for testing the transmission of a signal throughout the servo system;

Fig. 3 is a simplified diagram of a circuit corresponding to that represented in Fig. 2 but connected for testing certain elements only of a servo system more nearly in the manner of Fig. 1;

Fig. 4 is a more detailed diagram showing the essential internal circuits of the low frequency oscillator included in the frequency analyzer circuits illustrated in the other figures; and Fig. 5 is a diagram of substantially the circuit represented in Fig. 3 but with the carrier frequency oscillator of that circuit connected to the stator winding of one of two mechanically connected synchro elements of a servo system instead of to a modulator which is thus omitted.

Referring now more particularly to the drawings, the circuit illustrated in Fig. 1 includes a low frequency oscillator 1 of any convenient character, such as that illustrated in Fig. 4 and hereafter more fully described, operable to produce a signal of periodic voltage fluctuation at a known amplitude and phase angle, and including adjusting mechanism affording a control of the frequency of fluctuation of its output signal voltage. The oscillator is connected through a pair of conductors 2 to a phase shifter 3 which is also desirably adjustable to permit modification of the phase angle of the signal delivered by the oscillator, the phase shifter being connected in turn through conductors 4 to two terminals of a watt meter 5 whereby the oscillator signal after being subjected to the action of the phase shifter is fed to the watt meter in which, as will hereafter more fully appear, it is compared with a signal received from the system of which frequency analysis is being made in response to a signal from the oscillator transmitted therethrough. The transmission system being analyzed in the diagram of Fig. 1 may be assumed to be an electrically actuated servo system of which only the servo amplifier 6 and directed element 7 are indicated. The shaft 8 of the latter actuates a movable contact 9 along a slide wire 10 or other generally comparable instrument to which is connected a battery 11 and center tapped voltage divider 12, contact 9 and shaft 8 through a conductor 13 being connected at terminal 14 to amplifier 6. A conductor 15 connects one output terminal 16 of the oscillator with the center tap 17 of the voltage divider and the other output terminal 18 of the oscillator is connected through a conductor 19 with the other input terminal 20 of the amplifier. The voltage difference between conductors 13 and 15 is thus modified in accordance with the position of the directed element at any moment, these several elements in effect constituting a feed back circuit. Conductors 21, 22 connect the two input terminals 14 and 20 of the amplifier to one pair of points 23, 24 of a double pole double throw switch 25 through which their electrical connection with a second pair of terminals 26, 27 in watt meter 5 may be effected by way of a pair of conductors 28. Additional points 29, 30 of this switch facilitate connecting the last mentioned terminals of the watt meter with conductors 13 and 15 in the feed back circuit.

With this arrangement of the circuits, let it be assumed that the low frequency oscillator is delivering a signal $A(\cos \omega t)$ through conductors 15 and 19 and a corresponding signal $B[\cos(\omega t+\varphi)+ \ldots]$ through conductors 2 to phase shifter 3 when the latter is set to angle $\varphi$, setting up in feed back conductor 13 a signal $$C[\cos(\omega t+\varphi_1)+ \ldots]$$

and a corresponding signal $D[\cos(\omega t+\varphi_2)+ \ldots]$ at terminals 14 and 20 of the servo amplifier. When switch 25 is positioned to connect servo amplifier input terminals 14 and 20 with watt meter 5 an indication is obtained in the latter of certain characteristics of signal D in relation to signal B. By adjusting phase shifter 3 until a minimum indication appears at watt meter 5, the phase angle $\varphi_2 \pm 90°$ of signal D relative to signal B is obtained; by adjusting the phase shifter to the maximum watt meter reading there can be derived from the latter the value of the product of the amplitudes of signals D and B. Then the switch is shifted to connect feed back circuit conductors 13 and 15 to the watt meter and a second set of readings secured. The phase and amplitude of the transmitted signal in relation to those of the oscillator signal may thus be derived as data for plotting suitable curves.

An advantage of employing a watt meter rather than some other instrument for this determination is that it may be supplied with two signals of which one may contain a fundamental and harmonics while the other contains the said fundamental only and an adequate comparison of the two signals is afforded since the watt meter is insensitive to the harmonics under these conditions. It will be apparent that when a sufficient number of such determinations has been made adequate data are at hand from which may readily be deduced information demonstrating the characteristics of the system being tested. The manner in which these data are obtained illustrates the advantage of frequency analysis in accordance with the invention; it can be demonstrated that if the system were ideal with conductor 13 directly connecting with conductor 15 and the feed back loop thus omitted, the directed element would oscillate exactly in accordance with the signal supplied to it from the oscillator, that is, with the same frequency, amplitude and phase angle. Obviously, however, the system cannot be perfect and through the presence of the feed back circuit controlled in accordance with the position of the directed element the latter automatically adjusts itself to accommodate a distorted signal received from the oscillator and to cause the distorted signal to approach in value the undistorted one delivered by the oscillator.

Fig. 2 illustrates a circuit for study of an entire servo system as a unit which is in many respects similar to the circuit shown in Fig. 1 and comprises many of the identical elements designated by the same reference characters as in Fig. 1 but with the addition of a prime ('). In this circuit, however, we employ a carrier frequency oscillator 31 delivering a carrier frequency signal $E(\cos \alpha t)$ to a phase sensitive demodulator 32; the demodulated signal is added to the low frequency signal A' produced by the low frequency oscillator 1' and another similar demodulator 33 is interposed between the oscillator 31 and switch 25' on the one hand and the watt meter 5' on the other. Fig. 2 also includes a directing element 34 of the servo system which of course normally supplies the actuating signal to the directed element generally designated 7', it often being of advantage that circuits in the directing element be included within the scope of the study being made.

The servo amplifier used in the circuit illustrated in Fig. 2 consists of three elements, namely a carrier frequency amplifier 35, the demodulator 32 and a direct current amplifier 36. The output of the latter is connected to the directed element 7' which desirably includes a motor 37 and coupled synchro element 38 generating a feed back signal CE for delivery to the input circuit of the carrier frequency amplifier through the feed back conductor 13'. The carrier frequency oscillator 31 is connected through conductors 40 with the stator of the directing element 34 of the servo system, through conductors 41 with demodulator 32 in the amplifier unit and through other conductors 42 with the stator of synchro element 38 of the directed unit, the rotors of said directing element 34 and synchro element 38 being the sources of the distorted and feed back signals supplied to amplifier 35. The synchro element 38 is made with two of its stator coils connected in series and the position of the rotor determines the phase and magnitude of the rotor voltage.

In operation the circuits illustrated in Fig. 2 function as follows: Assuming first inoperativeness of the low frequency oscillator, upon the adjustment of the rotor of the directing element 34 to a given position unless the rotor of synchro element 38 of directed element 7' is at an exactly corresponding position the two rotor voltages differ in magnitude and/or phase. Through the connections in the circuits described the resulting difference signal is imposed upon the carrier frequency amplifier 35 and is amplified thereby for feeding to the phase sensitive demodulator 32 which produces therefrom a direct current the magnitude of which depends on the size of the difference signal and the sign of which depends on the phase relationship between the difference signal and the carrier signal. The direct current output of demodulator 32 is amplified by D. C. amplifier 36 and supplied to directed motor 37 which then adjusts itself in a direction reducing the difference signal to a minimum, at which the position of its rotor agrees closely with the position of the rotor of directing element 34. Now assume low frequency oscillator 1' is connected as illustrated and a low frequency signal A' added to the D. C. output signal of demodulator 32 in the amplifier unit. The resulting signal will be amplified in D. C. amplifier 36 and applied to the directed motor causing the latter to adjust itself in correspondence to the characteristics of low frequency signal A' and at a frequency equal to that of said signal. Under these conditions the signal from the rotor of synchro element 38 is a signal corresponding to carrier frequency signal E modulated by low frequency signal A' and as this signal is fed back to the input of carrier frequency amplifier 35, amplified therein and demodulated in phase sensitive demodulator 32 to a relatively low frequency signal, it is substantially similar in all respects to that produced by the low frequency oscillator as regards phase and amplitude except insofar as the characteristics of the system alter these characteristics of the signal during its transmission therethrough. Because the system is not ideal they are not precisely similar but when adequate amplification of the D. C. amplifier is afforded differences between them may be held to a minimum.

It is believed the operations incident to determining the effect of the transmission of the signal through the system comprising the servomotors illustrated in Fig. 2 will be evident without further discussion in light of the preceding explanation of use of the circuits illustrated in Fig. 1.

The circuits of Fig. 3 are in many respects substantially similar to those illustrated in Fig. 2, the exception being, however, that a modulator 45 is provided for modulating the signal of carrier frequency oscillator 31' in accordance with the oscillation of low frequency oscillator 1" whereby a modulated signal is supplied to servo amplifier 6", illustration of a directing element of the servo system being omitted from Fig. 3 as well.

The circuit illustrated in Fig. 3 operates in a manner not greatly at variance with that of the preceding figure, low frequency oscillator 1" supplying a signal to modulator 45 for modulating carrier frequency signal E' received from carrier frequency oscillator 31' and the thus modulated signal A"E' when delivered to carrier frequency amplifier 35' of servo amplifier unit 6" is amplified and then demodulated in phase sensitive demodulator 32' of the unit, said demodulator being supplied with a reference signal E' from the carrier frequency oscillator to control and afford a determination of the sign of the demodulated signal. The latter which resembles original low frequency signal A" from the low frequency oscillator after amplification in D. C. amplifier 36' supplies D. C. motor 37' of directed element 7" the shaft of which is coupled to the rotor of a synchro element 38'. Two of the three field windings of the latter are series connected to unmodulated carrier frequency signal E' from carrier frequency oscillator 31' and the directed element adjusts itself to the low frequency demodulated signal at a frequency corresponding to the signal produced by low frequency oscillator 1". The signal C'E' from the rotor of synchro element 38' however is one corresponding to the carrier frequency modulated by the low frequency signal and otherwise affected by transmission through the system and is fed back to the amplifier input. If this feed back were eliminated, in an ideal system the directed unit would operate exactly in accordance with the modulation of the signal in the modulator and the signal from the rotor of the synchro unit would correspond exactly thereto. Imperfections in the system result in the directed element adjusting itself to a signal distorted by transmission from the modulator through the system and the signal from the rotor of the synchro element in the directed element is therefore also distorted with respect to the modulated signal. As the feed back is combined with the modulated signal the signal supplied to the amplifier represents the difference between the latter and the modulated signal. By providing amplification in the amplifier the difference between these two signals can be kept at a minimum with the result the directed element 7" tends toward adjustment in agreement with the modulated signal. The distorted signal and the error signal are of carrier frequency but are modulated at low frequency and for purposes of comparing them with the latter are demodulated by a phase sensitive demodulator 33' before being introduced to the watt meter 5" whereby the watt meter receives two signals of a generally comparable nature for showing the differences between them.

It is believed evident without extended discussion that the circuits of Fig. 4 may be employed for providing a low frequency signal if desired. This figure illustrates the use of a pair of oscillators 50, 51 the first of which is desirably of fixed frequency and the latter adjustable. They are connected together in such manner that when the signals $F(\sin 2\pi\gamma t$ and $$G\left[\sin 2\pi\left(\gamma \pm \frac{\omega}{2\pi}\right)t\right]$$

from the oscillators are supplied to the phase sensitive detector 52 a beat signal between the two is created at a frequency $$\left(\frac{\omega}{2\pi}\right)$$

equal to the difference between them. The oscillator signals are supplied to a second phase sensitive detector 54, that supplied from fixed frequency oscillator 50 being directed through a phase shifter 55 whereby the signals supplied to the second detector combine to create beat signals of different phase angles delivered through conductors 56, 57 respectively. By varying the adjustment of phase shifter 55 the phase angle φ can be varied while the beat frequency can be controlled through adjustment of the variable frequency oscillator in the circuit, the resulting low frequency signals of different phase angles being thus made readily available for use in connection with making the determinations to which reference has herein been made in frequency analysis of electrical transmission systems and the like.

In Fig. 5 we have illustrated a further modified circuit in which the servo system comprises a pair of synchro elements 60, 61 the rotors 62, 63 of which have a common shaft 64. The stator 65 of element 60 is fixed and the position of stator 66 of element 61 is variable through the medium of a ring 67 fixed to stator 66 and movable therewith. Adjacent ring 67 is a second fixed ring 68 carrying a phase angle scale 69 whereby an index pointer 70 fixed to stator 66 and movable therewith affords readings of phase angle differences between the positions of stators 65, 66, the common shaft 64 of the rotors being adapted to be rotated by a motor 71. This motor may be driven at a convenient speed controlled through the medium of a knob 72 provided with an index scale 73 showing the motor speed corresponding to that for which the knob is set. The synchro element 60 in this illustration performs the function of the modulator 45 in Fig. 3 and switch 25''' connects the rotor winding of synchro element 61 selectively to the amplifier input or the feed back conductors, the movable stator winding of this element being connected to demodulator 33'' while a volt meter 74 is connected to the latter alone and affords adequate indications in cooperation with the other elements described.

In this arrangement a carrier wave frequency signal E'' from oscillator 31'' is supplied to stator 65 after the manner of the carrier wave signal in Fig. 3 and with the rotor stationary is transmitted unmodified through the servo system; rotation of shaft 64 and rotors 62, 63 carried thereby modulates the signal at a frequency corresponding to the rotational speed of the shaft and a signal through switch 25''' is superposed on the rotor winding. It can be multiplied by the demodulated carrier wave signal for making determinations in accordance with the foregoing, or the feed back signal to amplifier 6''' may be correspondingly multiplied and comparable results obtained as from the preceding circuits, the phase angle differences of the signals, as well as the products of their amplitudes being determined with the assistance of rotation of rotor 63 of synchro element 61 which renders unnecessary the employment of a watt meter as in the preceding figures. Thus the phase angle difference depends on the position of ring 67 and stator 66 controlled thereby and is read from ring 68 at the point indicated on scale 69 by pointer 70 when through variously positioning the stator a point corresponding to the minimum indication of voltage in the volt meter, preferably zero, has been found. Thus when at this position the index on the stator serves as a showing of the phase angle difference of the signals and when the stator is moved so as to produce a maximum voltage in the volt meter the reading of the latter represents the product of the amplitudes of the signals supplied through the servo system and from the oscillator respectively.

Although we have described certain embodiments of our invention and explained some of their uses we nevertheless do not desire or intend to limit or confine ourselves thereto as changes and modifications in the various connections, as well as in apparatus employed, will readily occur to those skilled in the art and may be utilized if desired without departing from the spirit and scope of the invention as defined in the appended claims.

Having thus described our invention, we claim and desire to protect by Letters Patent of the United States:

1. Means for carrying out modulation frequency analysis of a transmission system comprising a signal generator creating a carrier wave signal of constant frequency, which is supplied to the system, electrical mechanical means for modulating the carrier wave signal including means for varying the modulation frequency, means taking out from the system the modulated signal after it has been transmitted through at least part of the system, demodulating means having a connection to said signal generator, and means for comparing the modulation characteristics of the taken out signal with the modulation characteristics of the signal modulated by said modulating means as impressed upon the system.

2. Means according to claim 1 characterized by the taken signal comparing means being adapted for multiplying amplitudes of the signal supplied to it.

3. Means according to claim 1 characterized by the signal comparing means comprising a volt meter and phase shifting means connected therewith.

4. Means according to claim 1 characterized by the signal comparing means comprising a phase shifter whereby one of the signals which is compared is phase shifted.

5. Means according to claim 1 in which the carrier wave signal modulating means and the modulation characteristics comparing means each comprise one of a pair of synchro elements and in which a variable speed motor provides activating means for both elements.

6. Means according to claim 1 in which the carrier wave signal modulating means and the modulation characteristics comparing means each comprise one of a pair of synchro elements and in which said elements are driven from a common shaft and a variable speed motor is provided for driving the shaft.

References Cited in the file of this patent

UNITED STATES PATENTS

| Number | Name | Date |
|---|---|---|
| 1,645,618 | Nyquist | Oct. 18, 1927 |
| 1,869,209 | Mead, Jr. | July 26, 1932 |
| 2,214,130 | Green et al. | Sept. 10, 1940 |
| 2,314,851 | Barney et al. | Mar. 23, 1943 |
| 2,337,541 | Burgess | Dec. 28, 1943 |
| 2,416,310 | Hansen et al. | Feb. 25, 1947 |
| 2,452,587 | McCoy | Nov. 2, 1948 |